United States Patent [19]

Griebeler

[11] Patent Number: 5,041,784

[45] Date of Patent: * Aug. 20, 1991

[54] MAGNETIC SENSOR WITH RECTANGULAR FIELD DISTORTING FLUX BAR

[75] Inventor: Elmer L. Griebeler, Streetsboro, Ohio

[73] Assignee: Visi-Trak Corporation, Cleveland, Ohio

[ * ] Notice: The portion of the term of this patent subsequent to Feb. 12, 2008 has been disclaimed.

[21] Appl. No.: 437,129

[22] Filed: Nov. 16, 1989

[51] Int. Cl.⁵ .................................................. G01B 7/14
[52] U.S. Cl. ............................. 324/207.21; 324/235; 324/207.22
[58] Field of Search ................... 324/207.28, 207.21, 324/207.22, 251, 252, 235; 338/32 H, 32 R; 307/309

[56] References Cited

U.S. PATENT DOCUMENTS

| | | | |
|---|---|---|---|
| 3,846,697 | 11/1974 | Cila et al. | 324/207.21 X |
| 3,956,973 | 5/1976 | Pomplas | 92/5 R |
| 4,268,771 | 5/1981 | Lace | 310/155 |
| 4,311,981 | 1/1982 | Luzynski | 324/207.20 U |
| 4,384,252 | 5/1983 | Kolter | 324/239 |
| 4,611,169 | 9/1986 | Hermann | 324/208 |
| 4,612,502 | 9/1986 | Spies | 324/208 |
| 4,647,892 | 3/1987 | Hewitt | 336/83 |
| 4,727,323 | 2/1988 | Zabler | 324/207.21 X |
| 4,853,632 | 8/1989 | Nagano et al. | 324/207.21 |
| 4,859,941 | 8/1989 | Higgs et al. | 324/207.20 |
| 4,914,389 | 4/1990 | Juds | 324/207.21 |
| 4,935,698 | 6/1990 | Kawaji et al. | 324/207.20 |
| 4,944,028 | 7/1990 | Iijima et al. | 324/207.21 X |

FOREIGN PATENT DOCUMENTS 59-168382  9/1984  Japan ............................ 324/207.21

Primary Examiner—Kenneth A. Wieder
Assistant Examiner—Warren S. Edmonds
Attorney, Agent, or Firm—Fay, Sharpe, Beall, Fagan, Minnich & McKee

[57] ABSTRACT

A magnetic sensor for use in measuring the position, velocity, and/or direction of movement of an object having alternating zones of magnetic conductivity with a permanent magnet member having a pole face facing the moving object and having an axis transverse to the direction of movement thereof. A ferromagnetic strip of high permeability is mounted on the face of the magnet coaxial therewith having a length dimension in the direction of movement of the object greater than the width dimension transverse to the direction of movement. The ferromagnetic strip distorts the field of the permanent magnetic member in the area of a pair of the sensor elements such that the flux lines in the area of each of the sensors are urged toward a transverse direction relative to the direction of movement of the object, whereby the flux field in the area of each of the sensor is uniform.

14 Claims, 4 Drawing Sheets

MAGNETIC SENSOR WITH RECTANGULAR FIELD DISTORTING FLUX BAR

BACKGROUND OF THE INVENTION

This invention relates to the art of magnetic sensing devices and, more particularly, to an improved magnetic sensor for use in a system for measuring the position, velocity and/or direction of a moving object having alternating zones of different magnetic conductivity in the direction of movement.

It is of course well known to provide a transducer or motion sensor comprised of a permanent magnet having a pole face facing an object whose motion is to be detected and which pole face is provided with a magnetic field sensitive sensor element coaxial with the axis of the pole face. Such a motion sensing device is adapted to be positioned with the pole face and sensor element facing and spaced by an air gap from an object such as an axially reciprocable rod or a rotatable toothed gear formed of a magnetically conducting material. The rod may, for example, be provided with circumferentially extending grooves or threads, providing alternating lands and grooves, and the teeth of the gear are of course circumferentially spaced apart, whereby the rod lands and grooves and the gear teeth and spaces therebetween provide alternating zones of different magnetic conductivity in the direction of movement of the object. The lines of flux of the magnetic field of the permanent magnetic pass through the alternating zones as the object moves relative to the magnetic sensor, causing flux changes and inducing a current in the magnetic sensor which is proportional to the position of the moving object. The output of the magnetic sensor is applied to a suitable auxiliary electronic device to provide some desired function or display. It will be appreciated of course that the magnetic field of the permanent magnet is uniform with respect to a magnetic sensor centered on the pole face thereof so as to be coaxial with the axis of the pole face.

Often, it is desirable in connection with such a motion detecting device to provide for determining the direction of movement of the object. This can be achieved by providing two magnetic sensor elements on the pole face on opposite sides of the axis of the pole face and spaced apart in the direction of movement of the object by a distance proportional to the pitch of the rod lands and grooves or gear teeth. With such an arrangement, the flux changes at any given time resulting from the passage of the zones of different magnetic conductivity relative to each of the magnetic sensors will be different, thus producing different signals at the auxiliary electronic device capable of providing directional information with respect to the moving object. However, the mounting of two magnetic sensor devices on the pole face causes problems with respect to the signal output from the individual magnetic sensors. In this respect, the offset of the two magnetic sensors relative to the center of the magnet provides a magnetic field in the region of each of the magnetic sensors that is not uniform. In this respect, the magnetic flux on the side of each sensor which is nearest the center of the magnet is different from that on the side of the sensor furthest away from the center of the magnet. More particularly, each sensor element generally has a positive leg and a negative leg each producing an output signal to a comparator or differentiating device, and these legs are adjacent one another in the direction of movement of the object and, thus, are spaced differently with respect to the center of the magnet. Accordingly, the pattern of the magnetic field flux lines relative to the two legs is different, whereby the outputs of the two legs are different. This difference presents problems with respect to obtaining accurate and/or intelligent information with respect to movements of the object. It has been proposed to place a resistor in each leg of each sensor element to compensate for the effect of the difference in the flux field thereacross and, while such an arrangement does compensate for the imbalance, it does so only with respect to a given air gap between the sensor and moving object, and a given temperature in that the sensors are temperature sensitive. Therefore, any change in the air gap and/or temperature introduces error into the readings. A further problem encountered in connection with offsetting two sensor elements on laterally opposite sides of the center of the permanent magnet pole face is a considerable decrease in the signal-to-offset error ratio relative to that which exists with a single sensor element coaxial with the magnet axis. In this respect, the offset error level with two offset sensors can be thirty times the offset error level with a single centered sensor, and such a high offset error level makes it extremely difficult to obtain intelligent output signals from the sensors.

The present invention will be described in detail hereinafter in conjunction with magnetic field sensitive sensor elements in the form of silicon magnetoresistors mounted on a thin ferrite base. This type of sensor element adds an additional problem in connection with the manufacture of permanent magnet type transducers. In this respect, silicon magnetoresistors are extremely fragile, whereby a great deal of care must be exercised in connection with the mounting thereof on the pole face of a permanent magnet. In this respect, the attraction of the magnet during the mounting operation can impact the sensor against the pole face with such force as to shatter the fragile sensor element.

SUMMARY OF THE INVENTION

In accordance with the present invention, the pole face of a permanent magnet type transducer is provided with a pair of magnetic field sensitive sensor elements offset on opposite sides of the pole face axis in the direction of relative movement between the transducer and object, and the magnetic field in the area of each of the sensor elements is distorted so as to balance the magnetic field across each sensor element in the direction of relative movement between the sensor and object. More particularly in this respect, the normal, radial pattern of lines of the flux in the magnetic field generated by the permanent magnet is distorted in the area of each sensor element so as to extend transversely with respect to the direction of relative movement between the sensor and object, whereby the magnetic field between the radially innermost and radially outermost portions of the sensor element with respect to the magnet axis and the direction of movement is balanced. Thus, the output signals from the positive and negative legs of each of the sensor elements are more balanced, the offset error level is minimized, and more accurate readings are obtained. Moreover, these advantages are achieved in accordance with the present invention without restriction to a given air gap and/or ambient temperature, and without the use of resistors to obtain compensation for the imbalance of the magnetic field relative to the sensor element.

In accordance with a preferred embodiment of the invention, distortion of the magnetic field in the area of each of the sensor elements and thus a balanced effect of the field across each of the sensor elements is achieved by providing a ferromagnetic flux bar of high permeability between the pole face of the permanent magnet and the two sensor elements. The flux bar extends in the direction of movement of the object relative to the sensor elements and, preferably, is of a width generally corresponding to the dimension of the sensor elements in the direction transverse to the direction of movement of the object. The differential legs of the sensor are transverse to the length direction of the flux bar, and the preferred width of the bar optimizes distortion of the magnetic field in the area of each sensor such that the flux lines are transverse to the length dimension of the flux bar with respect to both legs of the sensor. Therefore, the flux field effecting both legs of each sensor is essentially the same. A further advantage realized in accordance with the foregoing preferred embodiment resides in the fact that the sensing elements can be of the silicon magnetoresistor type in which the ferrite base is preliminarily mounted on the flux bar before the latter is mounted on the pole face of the permanent magnet. This avoids fighting the magnetic field when mounting the sensor element and thus enables assembly with the permanent magnet without the same degree of care or the use of special tools otherwise required to avoid damaging or destroying the sensor elements during assembly with the permanent magnet.

It is accordingly an outstanding object of the present invention to provide an improved permanent magnet type transducer for use in determining the position, velocity and/or direction of movement of an object relative thereto and which object has alternating zones of different magnetic conductivity and wherein the transducer has magnetic field sensitive sensor elements on opposite sides of the center of the permanent magnet with respect to the direction of movement of the object relative thereto.

Another object is the provision of a transducer of the foregoing character having improved accuracy with respect to the readout of the magnetic field sensitive sensors.

A further obJect is the provision of a transducer of the foregoing character wherein the flux field generated by the permanent magnet is distorted in the area of each of the magnetic field sensitive sensor elements such that the lines of flux in the areas of the elements are constrained from a radial to a transverse direction with respect to the direction of movement of the object relative to the transducer.

Still another object is the provision of a transducer of the foregoing character wherein the magnetic field sensitive sensor elements are mounted on a ferromagnetic flux bar of high permeability which in turn is mounted on the pole face of the permanent magnet such that the flux bar distorts the magnetic field in the area of each of the sensor elements so that the magnetic field is balanced across the sensor element with respect to the direction of movement of the object relative thereto.

Still a further object is to provide a transducer of the foregoing character in which the sensor elements generate accurate output signals proportional to the magnetic field shape in the vicinity of the sensor elements independent of limited air gap and ambient temperature parameters.

Still a further object is the provision of an improved transducer of the foregoing character having a high signal-to-error offset noise ratio to enhance readability of the output signals of the sensors.

Another object is the provision of a transducer of the foregoing character in which the magnetic field sensitive sensor elements are structurally fragile and wherein assembly of the sensors and permanent magnet can be achieved in a manner which requires less concern with respect to damage or destruction of the sensor elements during the assembly operation.

BRIEF DESCRIPTION OF THE DRAWINGS

The foregoing objects, and others, will in part be obvious and in part pointed out more fully hereinafter in conjunction with the written description of a preferred embodiment of the invention illustrated in the accompanying drawings wherein.

DESCRIPTION OF PREFERRED EMBODIMENTS

Figure 2:
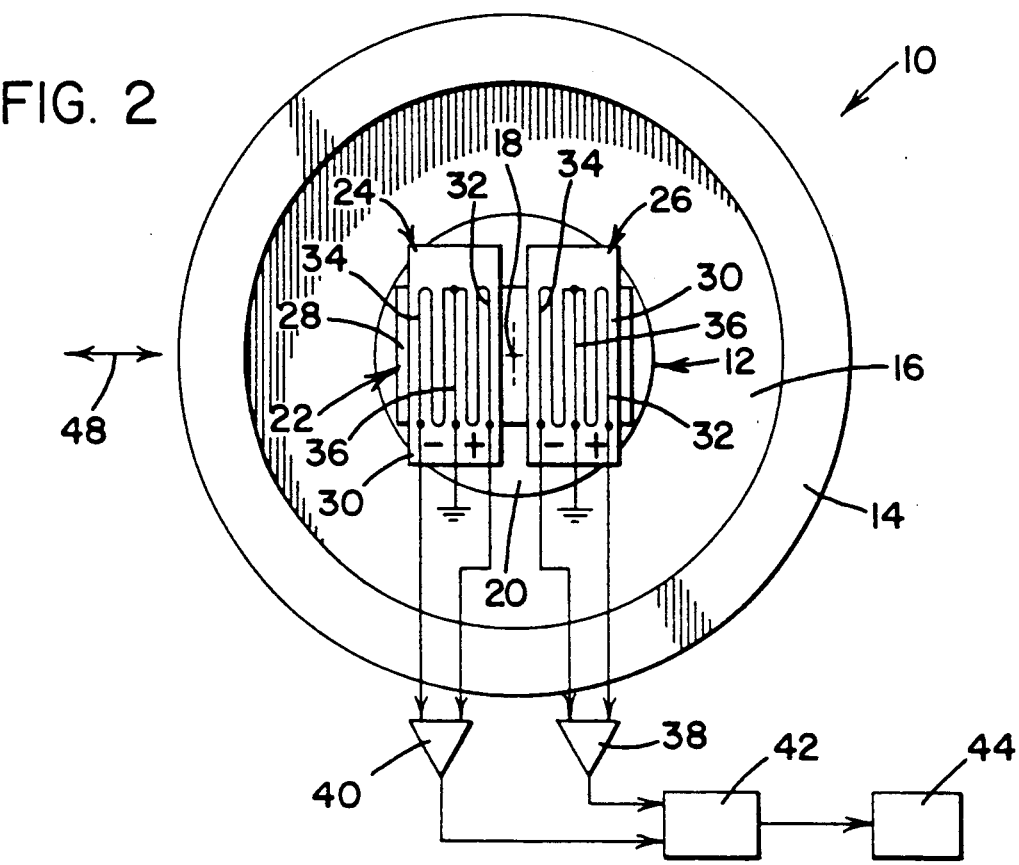
FIG. 2 is a plan view of the transducer taken along line 2—2 in FIG. 1 and schematically showing output connections from the sensor elements.
Figure 1:
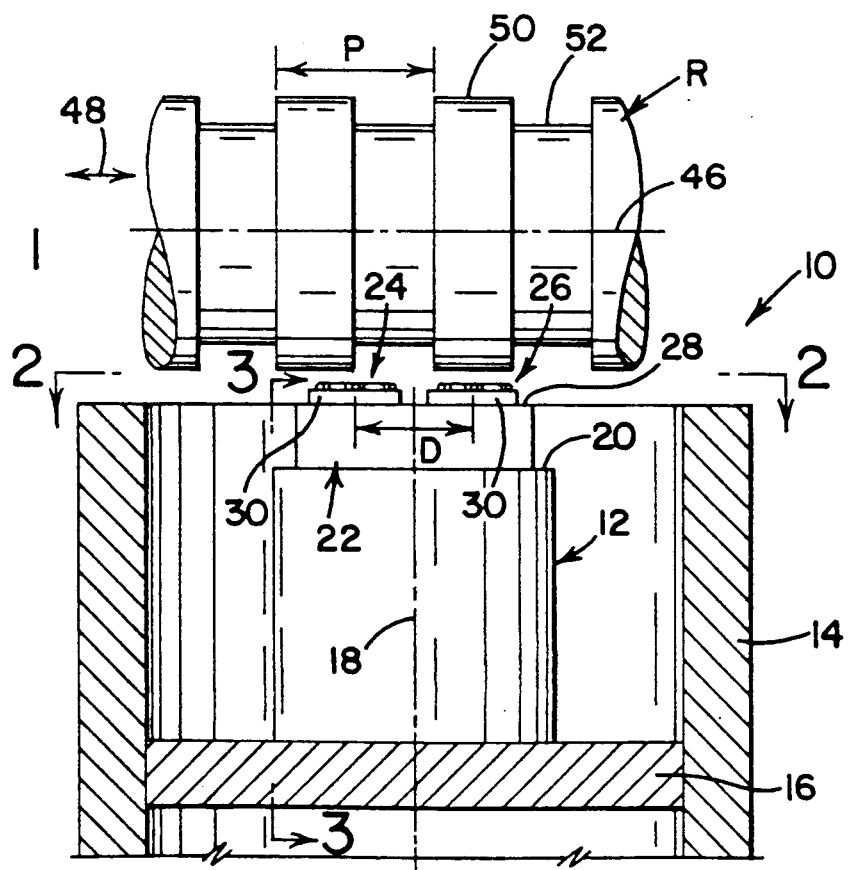
FIG. 1 is an elevation view, partially in section, of a transducer in accordance with the present invention and showing the transducer in motion sensing relationship with respect to a reciprocating object.
Figure 3:
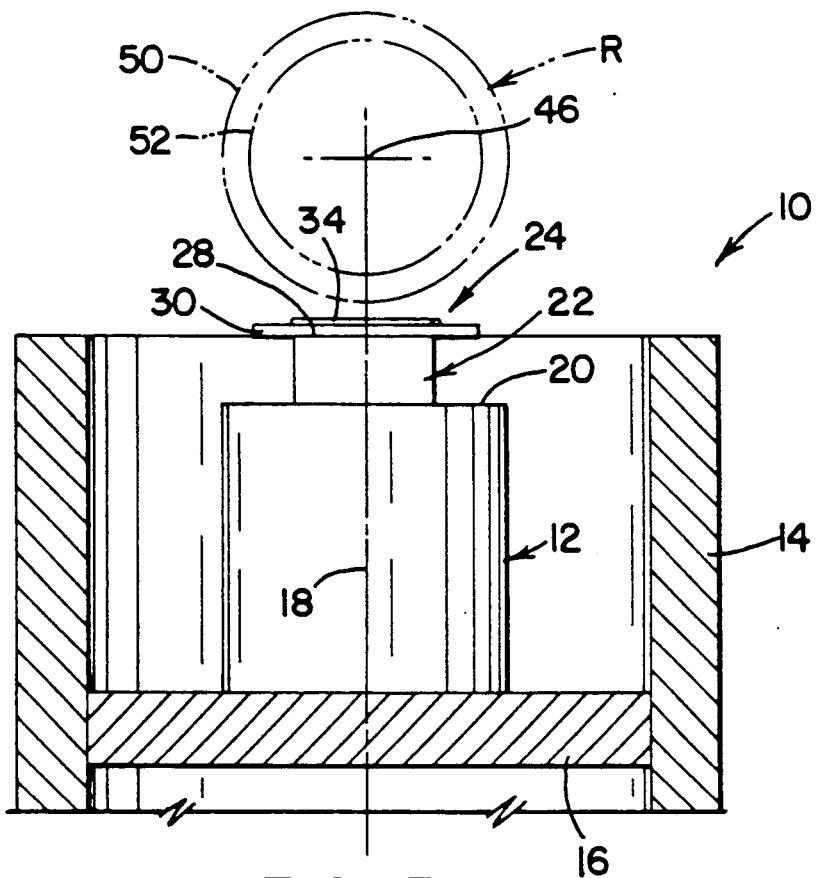
FIG. 3 is a sectional elevation view of the transducer taken along line 3—3 in FIG. 1.

With reference now in particular to the drawings wherein the showings are for the purpose of illustrating preferred embodiments of the invention only and not for the purpose of limiting the invention, FIGS. 1-3 illustrate a transducer 10 comprised of a cylinder body 12 of permanent magnet material such as samarium cobalt suitably mounted in a housing of mild steel defined by a cylindrical wall 14 radially spaced from and surrounding magnet 12 and a bottom wall 16 to which magnet 12 is suitably secured. Permanent magnet 12 has an axis 18 and a planar pole face 20, and a ferromagnetic flux bar 22 of high permeability, such as mild steel, is mounted on pole face 20 such as by an epoxy adhesive. Finally, a pair of magnetic field sensitive sensor elements 24 and 26 are mounted on outer surface 28 of flux bar 22 such as by an epoxy adhesive.

In the embodiment shown, each of the sensor elements 24 and 26 is preferably a silicon magnetoresistor type sensor element available from Siemens Components Corp. of Iselin, N.J. under the latter's product designation FT-100L60. Each of the sensor elements 24 and 26 is comprised of a thin base 30 of ferrite on which is mounted a differential silicon resistor having a positive leg 32, a negative leg 34 and a ground leg 36. As shown in FIG. 2, legs 32 and 34 of each of the sensors 24 and 26 are connected to differentiators 38 and 40 respectively having outputs to suitable electronic processing devices 42 and 44 as set forth more fully hereinafter.

As will be appreciated from FIGS. 1-3, transducer 10 is adapted to be positioned relative to a moving object of magnetically conducting material, such as a rod R having an axis 46 and which is axially reciprocable in opposite directions as indicated by arrow 48. As will be further appreciated from FIGS. 1-3, flux bar 22 has a length in the direction of movement 48 corresponding generally to the diameter of permanent magnet 12 and has a width transverse to direction 48 which corresponds substantially to the transverse length of legs 32 and 34 of sensing elements 24 and 26. Rod R has alternating lands 50 and grooves 52 providing alternating zones of different magnetic conductivity relative to transducer 10 as a result of different air gaps between the lands and grooves and sensor elements 24 and 26. Each land 50 and adjacent groove 52 provides a pitch distance P along rod R in the direction of movement 48, and the centers of sensing elements 24 and 26 as defined by ground legs 36 thereof are spaced apart in the direction of movement 48 a distance D which is proportional to pitch P and, preferably, equal to $\frac{1}{4}$, $\frac{3}{4}$ or $1\frac{1}{4}$ P, or other odd multiples of $\frac{1}{4}$ P. Proportionate spacing of the sensor elements is necessary in connection with determining the direction of movement of rod R relative to transducer 10 and, in this respect, avoids the output signals from the two sensors being identical and which identity would preclude differentiating between the signals to determine direction of movement.

Figure 4:
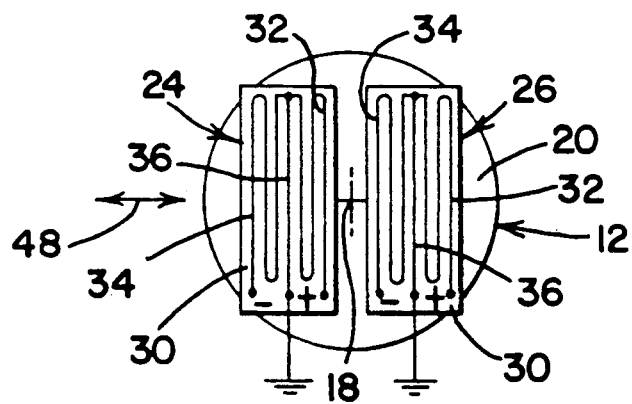
FIG. 4 is a plan view of a prior art transducer.

Before describing the operation of the embodiment illustrated in FIGS. 1-3, reference is made to FIG. 4 of the drawing showing a transducer structure as described hereinabove but without flux bar 22, whereby sensor elements 24 and 26 are directly mounted on pole face 20 of permanent magnet 12 and in the same orientation relative to magnet axis 18 and the direction movement of an object 48 as described hereinabove. In the structure shown in FIG. 4, the lines of flux in the magnetic field of permanent magnet 12 are generally radially of the permanent magnet relative to axis 18 about the periphery of the magnet whereby, with respect to each of the sensor elements 24 and 26, the lines of flux cut across legs 32 and 34 thereof differently relative to the corresponding ground leg 36. Therefore, for each of the sensor elements 24 and 26 there is an imbalance in the magnetic field being sensed by legs 32 and 34 of the corresponding sensor element as a result of the magnetic flux on radially opposite sides of ground leg 36 of each of the sensor elements being different. Therefore, with respect to rod R for example, displacement of the generally transverse edges of the lands and grooves of the rod relative to the sensor elements and the radial flux lines results in an imbalance in the outputs from the two legs of each element, whereby it is at best difficult to obtain accurate readout for determining the position, velocity and/or directional information sought with regard to the moving object.

As mentioned hereinabove, such field imbalance with the arrangement shown in FIG. 4 can be compensated for by adding resistors to the positive and negative legs of the sensing elements. However, the use of resistors as a compensating arrangement is limited to a given air gap and a given ambient temperature in that the resistors are temperature sensitive. It is neither practical, efficient nor desirable to attempt to control with precision either the air gap or ambient temperature in a given use situation. Moreover, even if the imbalance in the field is corrected through the use of resistors, any deviation from the given air gap and ambient temperature requirements results in inaccuracy of readout and increases the signal-to-error ratio problem referred to herein.

With the foregoing in mind and referring again to FIGS. 1-3 of the drawing, the positioning of flux bar 22 between the pole face of permanent magnet 12 and sensor elements 24 and 26 causes a distortion in the magnetic field generated by permanent magnet 12 which results in the lines of flux in the areas of legs 32 and 34 of each of the sensing elements 24 and 26 being constrained towards a direction transverse to the direction of movement 48 of the object being sensed. This promotes balancing the magnetic field in the area of each of the sensing elements 24 and 26 and thus across legs 32 and 34 on radially opposite sides of the corresponding ground leg 36 and, thus, results in improved accuracy with respect to the readout from the sensors. The area of most importance in connection with distortion of the magnetic field and constraint of the flux lines in the foregoing manner is the area immediately adjacent the laterally outer ends of legs 32 and 34 with respect to direction 48. Obtaining the desired transverse direction of the lines of flux in this area is promoted by providing for flux bar 22 to have a width in the lateral direction which corresponds substantially to that of legs 32 and 34 of the sensor elements. Furthermore, the transducer according to the present invention is not restricted either to a given air gap or to a given ambient temperature.

As mentioned hereinabove, the output signals from legs 32 and 34 of each of the sensor elements 24 and 26 are introduced to the corresponding one of differentiators 38 and 40, the output signals of which are introduced into suitable electronic processing devices 42 and 44. It will be appreciated that device 42 can, for example, be a digital process controller, digital to analog signal conditioner, or digital to binary coded decimal signal conditioner having output to device 44 which, for example, could be a counter, readout monitoring instrument servo controller or microprocessor.

The use of flux bar 22 advantageously enables preassembly of magnetic field sensitive sensors 24 and 26 with the bar prior to the mounting thereof on the pole face of magnet 12. In this respect, the pull of magnet 12 is so strong and the sensors so fragile that assembly of the sensors directly on the pole face of the magnet as heretofore required had to be done with extreme care. Otherwise, the attraction can cause the sensors to impact against the pole face with such force as to cause the sensors to shatter. By first mounting the sensors on the flux bar, the latter provides a rigid support for the sensors which precludes such damage during mounting of the flux bar on the magnet.

As a representative example of the dimensions of a transducer made in accordance with the preferred embodiment, permanent magnet 12 has a diameter of about 0.250 inch and an axial height of about the same dimension, and cylindrical wall 14 has an inside dimension of about 0.500 inch and an outside dimension of about 0.625 inch. Flux bar 22 has a length generally corresponding to the diameter of magnet 12 and has a width transverse to the direction of movement of about 0.120 inch and a height above pole face 20 of magnet 12 of about 0.060 inch. Ferrite base 30 for each of the sensor elements 24 and 26 has a width transverse to direction 48 of about 0.200 inch, and each of the sensor elements has a thickness including base 30 and the material of legs 32, 34 and 36 thereof of about 0.007 inch. As mentioned hereinabove, the width of flux bar 22 transverse to the direction of movement 48 corresponds generally to the length of legs 32, 34 and 36 of the sensor elements, and each of the sensor elements has a length between legs 32 and 34 in the direction of movement 48 of about 0.025 inch. It will be appreciated of course that sensor elements 24 and 26 are equally spaced on opposite sides of magnet axis 18, and that the spacing thereof is dependent on the pitch distance P. A preferred spacing is one and one-quarter of the pitch distance. A practical maximum air gap for the foregoing embodiment is about 0.030 inch, and the only limitation on a minimum air gap would be mechanical interference between the transducer and object.

Figure 5:
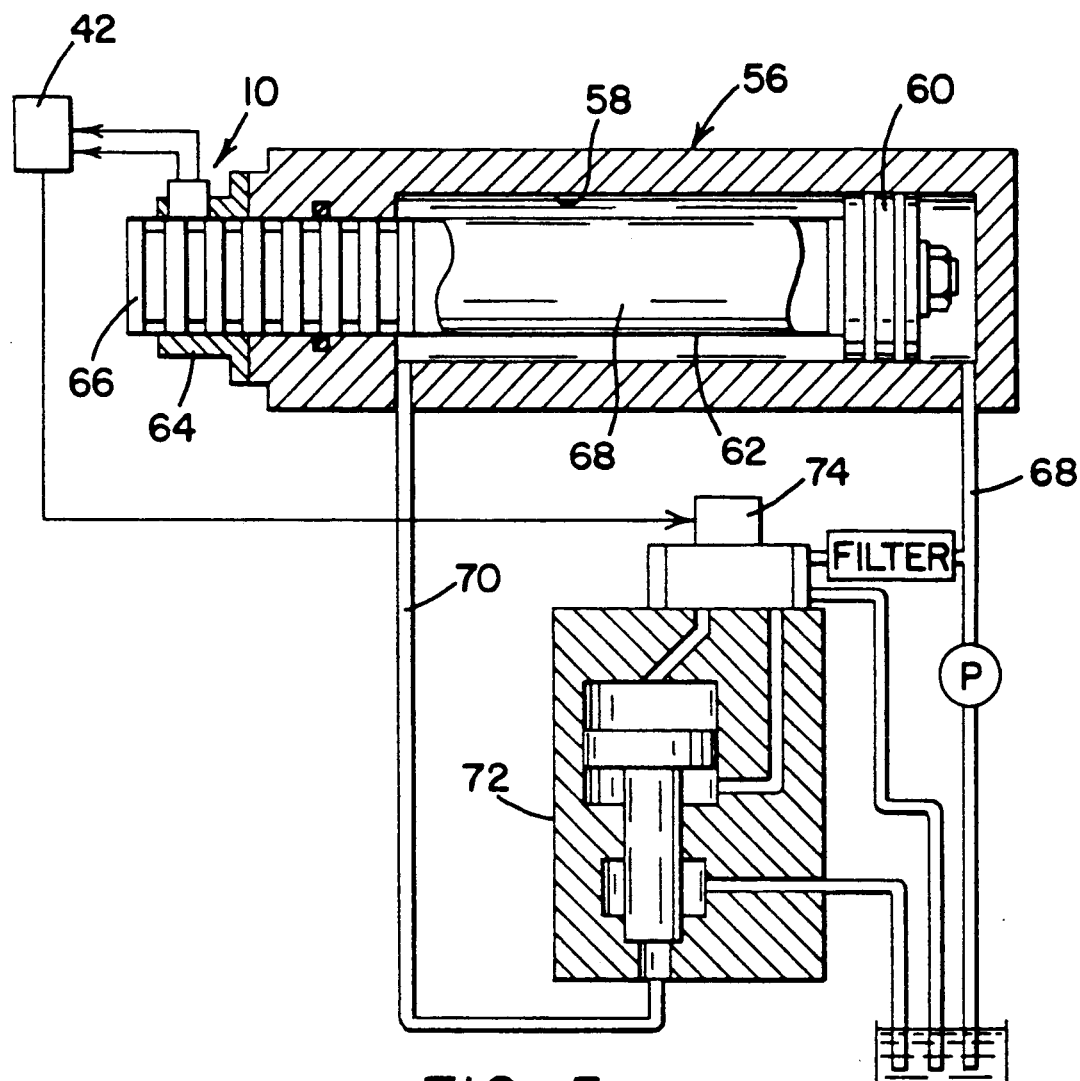
FIG. 5 is a schematic view, partially in section, showing use of a transducer in accordance with the present invention with the cylinder and piston components of a die casting machine; and, FIG. 6 is a perspective view of another embodiment of a transducer in accordance with the present invention.

One particular environment of use for the transducer in accordance with the present invention is in conjunction with positioning and monitoring the position, velocity and acceleration of the piston or ram of a metal die casting machine of the character disclosed in U.S. Pat. No. 3,956,973 to Pomplas, the disclosure of which is incorporated herein by reference. FIG. 5 of the drawing corresponds to FIGURE 1 of the latter patent, and will be described briefly herein in connection with the transducer of the present invention. FIG. 5 illustrates a cylinder and piston arrangement which includes a cylinder 56 providing a piston chamber 58 receiving piston 60. Piston 60 is provided with a piston rod 62 which extends through an opening in one end of cylinder 56 and through a packing gland 64 secured to the latter end of the cylinder. Piston rod 62 is provided with threads 66 extending axially therealong from the outer end of the piston rod to a distance towards piston 60 corresponding to the stroke thereof. Preferably, the piston rod is provided with a sleeve 68 of non-magnetic material which is shrunk fit on the piston rod to overlie the entire length of the threads and provide a smooth surface for reciprocating movement of the piston rod relative to cylinder 56. The piston rod is of a magnetically conductive material, and the threads therealong together with the recesses therebetween provide alternating zones of different magnetic conductivity along the piston rod.

Cylinder 56 has fluid inlet and outlet lines 68 and 70 communicating chamber 58 with a source of hydraulic fluid under pressure through a suitable speed control valve 72 which is controlled by a suitable servo valve unit 74. It will be appreciated, of course, that the flow of hydraulic fluid under pressure into the piston chamber alternately on opposite sides of piston 60 results in displacement of piston rod 68 outwardly and inwardly relative to cylinder 56, and that the speed of displacement of piston rod 68 can be controlled through valve 72. Transducer 10 in accordance with the present invention is suitably mounted on packing gland 64 and, as piston rod 68 moves axially outwardly and inwardly relative thereto, the sensing elements produce output signals which are respectively differentiated and fed as input signals to controller 42 which has an output signal to servo valve 74. In use, as the piston rod 62 moves axially, sensors 24 and 26 of transducer 10 generate pulse signals which are transmitted to controller 42 and which pulse signals provide the basis for determining the position, velocity and/or direction of displacement of the piston rod. In FIG. 5, controller 42 has an output to servo valve 74 which controls the hydraulic fluid pressure within chamber 58 of cylinder 56 and thus the position of the piston and piston rod 62. It will be appreciated of course that the sequence of the pulse signals from the two sensor elements of the transducer is indicative of the direction of movement of the piston rod and that the frequency of pulse signals is indicative of the speed of movement of the piston rod.

Figure 6:
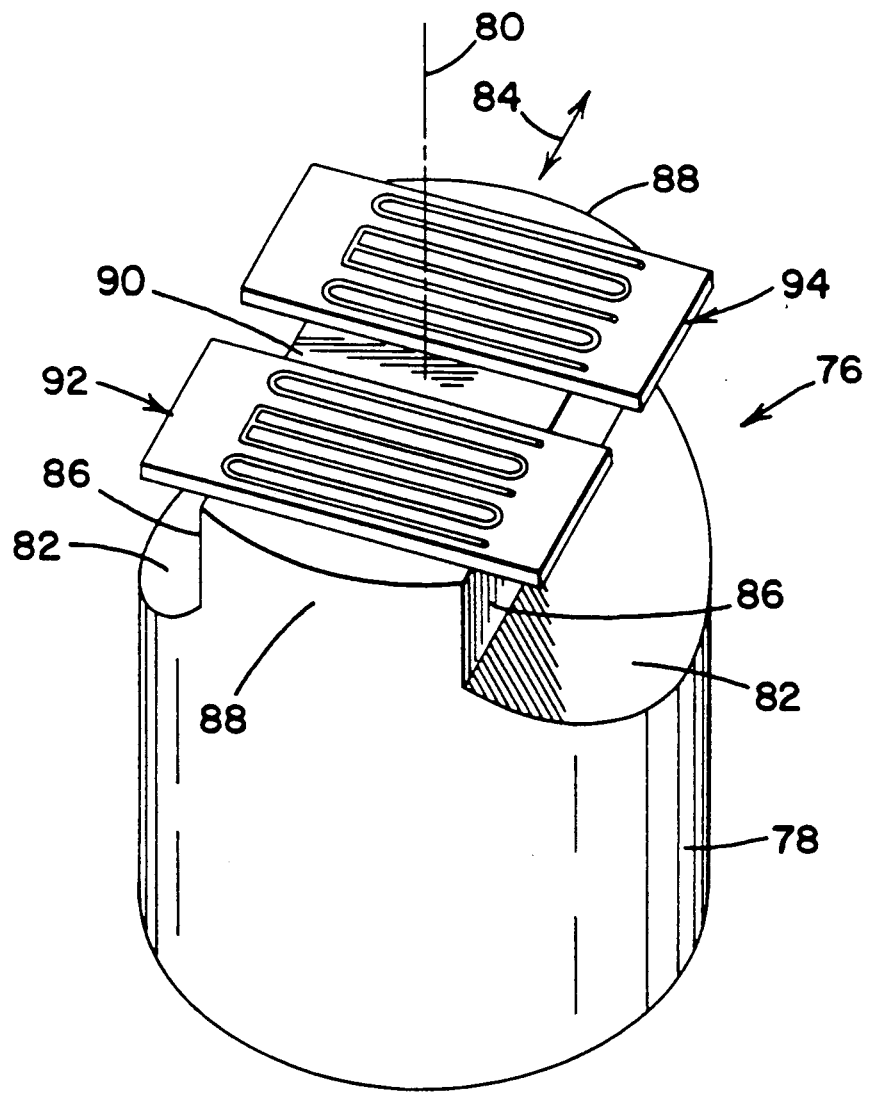

Because of the hardness and the difficulty of machining samarium cobalt, it is preferred in connection with the use thereof for the permanent magnet to provide the flux bar as a separate element mounted on the flat pole face of the magnet as described herein. However, the desired distortion of the magnetic field of the magnet in the areas of the sensors on opposite sides of the magnet axis can be provided by configuring the pole face end of the permanent magnet to have an integral flux bar shaped end as shown in FIG. 6 of the drawing. More particularly in this respect, permanent magnet 76 in FIG. 6 has a circular base portion 78 providing a magnet axis 80 and radially inwardly and upwardly tapered surfaces 82 on laterally opposite sides of the magnet with respect to the direction of relative movement 84 between the transducer and an object to be sensed. The upper end of magnet 76 terminates in a bar configuration having vertical side walls 86, end walls 88 defined by corresponding portions of the outer surface of the circular magnet, and a planar pole face 90 transverse to axis 80. Magnetic field sensitive sensor elements 92 and 94 which may correspond structurally to sensor elements 24 and 26 described hereinabove are mounted on pole face 90 on opposite sides of magnet axis 80 with respect to the direction of relative displacement 84. Based on the dimensions set forth hereinabove with regard to transducer 10, base portion 78 of magnet 76 would have a diameter of about 0.250 inch and an axially height to pole face 90 of about 0.310 inch, and the bar shaped upper end portion would have a width between side walls 86 of about 0.120 inch and a height along side walls 86 of about 0.060 inch, and a length in the direction 84 corresponding to the diameter of base portion 78. Sensors 92 and 94 would be dimensioned as described hereinabove with regard to sensors 24 and 26. In use, it will be appreciated that the flux bar shaped upper end of magnet 76 operates to distort the magnetic field of the magnet in the areas of sensors 92 and 94 so as to constrain the lines of flux to a transverse direction relative to direction of movement 84, thus to balance the field across both legs of each of the sensor devices.

While considerable emphasis has been placed herein on the structures and structural interrelationships between the component parts of the preferred embodiments, it will be appreciated that other embodiments of the invention can be made and that changes can be made in the embodiments herein illustrated and described without departing from the principles of the invention. In this respect, for example, Hall elements can be used for the magnetic field sensitive sensors, the primary disadvantage in doing so being the additional number of wires required relative to the preferred silicon magnetoresistor type sensors. As another example, the permanent magnet could be square rather than round. While a square magnet would have some tendency to improve the direction of the lines of flux in the areas of the sensor elements on opposite sides of the magnet axis, the flux bar arrangement according to the present invention is still necessary to obtain a balanced magnetic field across the entire length of each of the sensor elements in the direction of relative movement between the transducer and the object being sensed. It will be appreciated too that the permanent magnet can be made from a material other than the preferred samarium cobalt, and that the magnet, flux bar, and housing can be configured and dimensioned other than as described hereinabove in connection with the preferred embodiments. Furthermore, it will be appreciated that the transducer can be employed in connection with movable objects other than bars, such as gears, or other objects having or provided with alternating zones of different magnetic conductivity in the direction of sensing. These and other changes as well as other embodiments of the invention will be suggested or obvious to those skilled in the art upon reading the foregoing description of the preferred embodiments, whereby it is to be distinctly understood that the descriptive matter herein is to be interpreted merely as illustrative of the present invention and not as a limitation.

Having thus described the invention, it is claimed:

1. In a cylinder and piston assembly of a metal die casting machine comprising a cylinder having a cylinder axis, a piston axially reciprocable within said cylinder by fluid pressure means in a direction of axial reciprocation, a piston rod of magnetic material connected to said piston for axial displacement therewith and extending from said cylinder, said piston rod having a peripheral surface including axially spaced grooves, said surface and grooves being covered by a nonmagnetic material proving a smooth wear surface for said piston rod, and transducer means positioned near said wear surface to produce electrical pulse signals in response to movement of said grooves past said transducer means, the improvement comprising: said transducer means including, substantially cylindrical permanent magnet means having a permanent magnet axis and an end transverse to said permanent magnet axis and facing said wear surface, rectangular flux plate means of ferromagnetic material on said end of said magnet means for distorting a magnetic field of said permanent magnet means on opposite sides of said permanent magnet axis in the direction of axial reciprocation, and first and second magnetic field sensor means on said plate means, said first sensor means being offset from said permanent magnet axis on one of said opposite sides thereof, and said second sensor means being offset from said permanent magnet axis on the other of said opposite sides thereof.

2. The cylinder and piston assembly according to claim 1, wherein said permanent magnet means is circular in cross-section transverse to said permanent magnet axis defining a permanent magnet means diameter, and said flux plate means has a length in said direction of axial reciprocation substantially equal to the permanent magnet means diameter, a width transverse to said direction about one-quarter said diameter, and a height above said end about one-half said diameter.

3. The cylinder and piston assembly according to claim 2, wherein each said first and second sensor means includes silicon magnetoresistor sensing element means.

4. The cylinder and piston assembly according to claim 3, wherein said permanent magnet means is samarium-cobalt magnet.

5. The cylinder and piston assembly according to claim 4, wherein the distance between corresponding ends of adjacent grooves in said piston rod provides a pitch distance, each said first and second sensor means has a center in said direction, and said centers of said first and second sensor means are equally spaced from said axis and are spaced apart from one another a distance one and one-quarter of said pitch distance.

6. The cylinder and piston assembly according to claim 2 wherein said first sensor means comprises: a first positive leg circuit, a first negative leg circuit, a first neutral leg circuit, and first logic means not on said plate means, for generating a first signal responsive to movement of the piston, and wherein said second sensor means comprises: a second positive leg circuit, a second negative leg circuit, a second neutral leg circuit, and a second logic means not on said plate means, for generating a second signal responsive to the movement of the piston.

7. The cylinder and piston assembly according to claim 6 further comprising a digital process controller means, in electrical communication with the first and second sensor means, for determining a direction and a velocity of said piston responsive to the first signal and the second signal.

8. A transducer means in combination with a cylinder and piston assembly of a metal die casting machine comprising a cylinder having a cylinder axis, a piston axially reciprocable within said cylinder in a direction of axial reciprocation by fluid pressure means, a piston rod of magnetic material connected to said piston for axial displacement therewith and extending from said cylinder, said piston rod having a peripheral surface including alternating axially spaced portions of at least two different magnetic conductivity characteristics, the transducer means positioned near said surface to produce electrical pulse signals in response to movement of said portions past said transducer means, said transducer means further including substantially cylindrical permanent magnet means having a permanent magnet axis and an end transverse to said permanent magnet axis and facing said surface, rectangular flux plate means of ferromagnetic material on said end of said magnet means for distorting a magnetic field of said permanent magnet means on opposite sides of said permanent magnet axis in the direction of axial reciprocation, and first and second magnetic field sensor means on said plate means, said first sensor means being offset from said permanent magnet axis on one of said opposite sides thereof, and said second sensor means being offset from said permanent magnet axis on the other of said opposite sides thereof.

9. The combination according to claim 8, wherein said permanent magnet means is circular in cross-section transverse to said permanent magnet axis defining a permanent magnet means diameter, and said flux plate means has a length in said direction of axial reciprocation substantially equal to the permanent magnet means diameter, a width transverse to said direction about one-quarter said diameter, and a height above said end about one-half said diameter.

10. The combination according to claim 9, wherein each said first and second sensor means includes silicon magnetoresistor sensing element means.

11. The combination according to claim 10, wherein said permanent magnet means is a samarium-cobalt magnet.

12. The combination according to claim 11, wherein the distance between corresponding ends of adjacent portions in said piston rod provides a pitch distance, each said first and second sensor means has a center in said direction, and said centers of said first and second sensor means are equally spaced from said axis and are spaced apart from one another a distance one and one-quarter of said pitch distance.

13. The combination according to claim 9 wherein said first sensor means comprises: a first positive leg circuit, a first negative leg circuit, a first neutral leg circuit, and first logic means not on said plate means, for generating a first signal responsive to movement of the piston, and wherein said second sensor means comprises: a second positive leg circuit, a second negative leg circuit, a second neutral leg circuit, and a second logic means not on said plate means, for generating a second signal responsive to the movement of the piston.

14. The combination according to claim 13 further comprising a digital process controller means, in electrical communication with the first and second sensor means, for determining a direction and a velocity of said piston responsive to the first signal and the second signal.

* * * * *